(12) United States Patent
Suh et al.

(10) Patent No.: US 10,916,353 B2
(45) Date of Patent: Feb. 9, 2021

(54) APPARATUS AND METHOD FOR PRODUCING FIBROUS DEBRIS OF TEST FOR NUCLEAR POWER PLANT

(71) Applicant: KOREA HYDRO & NUCLEAR POWER CO., LTD., Gyeongsangbuk-do (KR)

(72) Inventors: Jeong-kwan Suh, Daejeon (KR); Jae Yong Lee, Daejeon (KR); Sun Guk Kwon, Daejeon (KR); Jae Won Kim, Daejeon (KR)

(73) Assignee: KOREA HYDRO & NUCLEAR POWER CO., LTD., Gyeongsangbuk-do (KR)

( * ) Notice: Subject to any disclaimer, the term of this patent is extended or adjusted under 35 U.S.C. 154(b) by 464 days.

(21) Appl. No.: 15/752,392

(22) PCT Filed: Aug. 19, 2015

(86) PCT No.: PCT/KR2015/008630
§ 371 (c)(1),
(2) Date: Feb. 13, 2018

(87) PCT Pub. No.: WO2017/030218
PCT Pub. Date: Feb. 23, 2017

(65) Prior Publication Data
US 2019/0006053 A1    Jan. 3, 2019

(30) Foreign Application Priority Data
Aug. 17, 2015 (KR) .................. 10-2015-0115379

(51) Int. Cl.
*G21C 17/022* (2006.01)
(52) U.S. Cl.
CPC ............................ *G21C 17/022* (2013.01)

(58) Field of Classification Search
CPC .......... G21C 9/00; G21C 9/004; G21C 9/016; G21C 9/02; G21C 15/18; G21C 17/00; G21C 17/02; G21C 170/22
See application file for complete search history.

(56) References Cited

U.S. PATENT DOCUMENTS

| 10,755,824 B2 * | 8/2020 | Bilanin .............. G21C 19/307 |
| 2012/0121056 A1 | 5/2012 | Sato et al. |
| 2015/0221403 A1 | 8/2015 | Kim et al. |

FOREIGN PATENT DOCUMENTS

| GB | 2 294 761 B | 5/1998 |
| KR | 10 2010 0012193 A | 2/2010 |

(Continued)

OTHER PUBLICATIONS

Suh, J.K. et al., Experimental Study of Pressure Drops Through LOCA-generated debris deposited on a fuel assembly, Nuclear Engineering and Design, 2015, pp. 49-59, 289.

(Continued)

*Primary Examiner* — Marshall P O'Connor
(74) *Attorney, Agent, or Firm* — Standley Law Group LLP; Stephen L. Grant

(57) ABSTRACT

The present invention is related to an apparatus and a method for producing fibrous debris of test for a nuclear plant. More particularly, producing fibrous debris of test having the uniform length distribution equal to the fibrous debris collected by a plurality of strainer bags while passing through a strainer in length distribution degree, and conducting a test for evaluating the influence of debris in the core due to a loss of coolant accident based on the produced fibrous debris for testing, thereby ensuring reproducibility of a test by the fibrous debris of test having a uniform length distribution and, thereby producing conservative experimental data.

8 Claims, 4 Drawing Sheets

(56) References Cited

FOREIGN PATENT DOCUMENTS

| KR | 10 2012 0025106 A | 3/2012 |
|---|---|---|
| KR | 10 1406715 B1 | 6/2014 |
| KR | 101503288 B1 | 3/2015 |
| KR | 101536235 B1 | 7/2015 |

OTHER PUBLICATIONS

Kim, Jae Won, et al, "Fibrous Debris for In-Vessel Downstream Effect Tests of the Nuclear Power Plants", 2015 Spring Mtg of the Korean Society of Energy, p. 103, Apr. 9, 2015.

* cited by examiner

APPARATUS AND METHOD FOR PRODUCING FIBROUS DEBRIS OF TEST FOR NUCLEAR POWER PLANT

TECHNICAL FIELD

The present invention relates to an apparatus and a method for producing of test for the nuclear power plant, and more particularly, to producing technology for fibrous debris of test for evaluating an accident such that fibrous debris generated due to a loss of coolant accident in a nuclear power plant passes through a sump strainer and is deposited on the reactor core region.

BACKGROUND ART

After the occurrence of a loss of coolant accident in the reactor building, the cooling water injected into the reactor core through the emergency core cooling system or sprinkled through the containment spray system is collected in the containment sump, and the collected water is used as a suction source of the emergency core cooling system pump.

In general, a sump is equipped with a strainer to protect the emergency core cooling system-related apparatus during recirculation operation from various debris generated during a virtual pipeline rupture such as a loss of coolant accident and moved to a containment sump.

The various debris generated during a virtual pipeline rupture accident and moved to a containment sump are screened by the strainer, however the debris of a size smaller than a mesh of the strainer can be passed through the strainer, and deposited on the reactor core region. Consequently, the deposited substances may block the flow path and affect core cooling ability in the long term.

Tests are required for evaluating the influence of debris in the core due to a loss of coolant accident. And then tests are conducted by varying debris composition and flow rate. Fibrous type debris, particle type debris, and compound debris can be used for tests.

Among the debris used in tests, a fibrous substance has the most dominant influence on the clogging of the core inlet, and the core inlet is clogged depending on the length distribution of the debris. Accordingly there is a pressure difference of the water supplied to the core.

In the test facility for evaluating the influence of debris in the core due to a loss of coolant accident, if the length distribution of the fibrous debris is not controlled, the test reproducibility cannot be ensured. Accordingly, there may be a problem that conservative experimental data cannot be produced.

Accordingly in the present invention, after fibrous debris of test having a uniform length distribution is produced, it is used for a test for evaluating the influence of debris in the core due to a loss of coolant accident based on the produced fibrous debris for testing, thereby, ensuring reproducibility of a test for evaluating the influence of debris in the core due to a loss of coolant accident and suggesting a solution for producing conservative experimental data.

DISCLOSURE

Technical Problem

The present invention has been made in consideration of the above problems, and it is an object of the present invention to provide an apparatus and a method for producing a test debris for a nuclear power plant for securing reproducibility of a test evaluating differential pressure change of water supplied to the core and for producing conservative experimental data by producing fibrous debris of test having the length distribution equal to the length distribution of fibrous debris passed through a strainer and by testing for evaluating the influence of debris in the core due to a loss of coolant accident with the produced fibrous debris for testing as an input element.

Technical Solution

In order to accomplish the above technical object, an apparatus for producing a test debris for a nuclear power plant comprises:

a plurality of fibrous debris strainer bags for collecting fibrous debris passed through a sump strainer, and further comprise: a sample fibrous debris deriving unit for measuring the length distribution of fibrous debris collected in a plurality of the strainer bags, and deriving a sample fibrous debris by removing a distorted length distribution among the measured length distribution of fibrous debris; and a fibrous debris producing unit for producing fibrous debris of test having a uniform length distribution equal to the length distribution of the sample fibrous debris of the sample fibrous debris deriving unit and using the fibrous debris for the core downstream type effect test.

Preferably, the sample fibrous debris deriving unit may comprise: a length distribution measuring unit for measuring the length distribution of the collected fibrous debris; a filtering unit for removing fibrous debris in a distorted length distribution region and extracting the length distribution of fibrous debris within a predetermined critical range with respect to the length distribution of the measured fibrous debris; and a sample fibrous debris generating unit for setting the length distribution of the fibrous debris passed through the filtering unit as the length distribution of the sample fibrous debris.

Preferably, the fibrous debris producing unit is provided to produce fibrous debris of test by pulverizing aged fiber so that the fibrous debris of test can have the length distribution of the sample fibrous debris, and the fibrous debris producing unit may comprise: a cutter for cutting aged fiber to a predetermined size; a weighing scale for selecting fiber of a predetermined weight by measuring the weight of the cut fiber of a predetermined size; a controller for setting the pre-stored applied voltage and the pulverization time according to the type of strainer; and a pulverizer for pulverizing fiber of a certain weight based on the voltage applied to the controller and the pulverization time for pulverizing the fiber having a predetermined weight and size to the length distribution of the sample fibrous debris. The controller measures the length distribution of the fibrous debris pulverized by the pulverizer, and judges whether the measured fibrous debris length distribution coincides with the length distribution of the sample fibrous debris. In case coincidence occurs, the applied voltage and the pulverization time of the pulverizer may be stored in a predetermined memory area with the matched type of strainer.

A method of producing fibrous debris based on the apparatus as described above comprises the following steps:
(A) collecting fibrous debris passed through a strainer in a plurality of strainer bags; (B) measuring the length distribution of the fibrous debris collected by the sample fibrous debris deriving unit; (C) removing fibrous debris in a distorted length distribution region with respect to the length distribution of the measured fibrous debris and setting the length distribution of the fibrous debris within a predetermined critical range to the length distribution of the sample fibrous debris; and (D) generating fibrous debris of test having a uniform length distribution equal to the length distribution of the sample fibrous debris in the fibrous debris generating apparatus.

Preferably, the step (D) may comprise the steps of cutting given aged fiber to a predetermined size; measuring the weight of the cut fibers of a predetermined size so as to select fibers of a predetermined weight; controlling pulverization for setting a predetermined applied voltage and pulverization time according to the type of strainer; and pulverizing for producing fibrous debris of test having a uniform length distribution equal to the length distribution of the sample fibrous debris with the fibers having a predetermined weight based on the applied voltage and the pulverization time. In addition, the step (D) measures the length distribution of the fibrous debris pulverized by the pulverizer, judges whether the measured fibrous debris length distribution coincides with the length distribution of the sample fibrous debris, and stores the applied voltage and the pulverization time of the pulverizer in a predetermined memory area by matching with the type of strainer in case coincidence occurs.

Advantageous Effects

According to the embodiment of the present invention as described above, fibrous debris of test having the uniform length distribution equal to the fibrous debris collected by a plurality of strainer bags while passing through a strainer is produced, and a test for evaluating the influence of debris in the core due to a loss of coolant accident is conducted based on the produced fibrous debris for testing, thereby ensuring reproducibility of a test for evaluating the influence of debris in the core due to a loss of coolant accident and, thereby producing conservative experimental data.

DESCRIPTION OF DRAWINGS

The accompanying drawings, which are incorporated in the specification, illustrate preferred embodiments of the present invention and, together with the detailed description of the invention given below, serve to further the understanding of the technical idea of the invention. However, they should not be construed as limited to the descriptions of the drawings set forth herein.

BEST MODE

Specific features and advantages of the present invention will be clearly described in the description with respect to the accompanying drawings. The terms and words used in the present specification and claims are to be construed in accordance with the technical idea of the present invention based on the principle that the inventor can properly define the concept of the term in order to explain the invention in the best way. It should be construed in terms of meaning and concept. In the following description, well-known functions or constructions are not described in detail to avoid obscuring the subject matter of the present invention.

Figure 1:
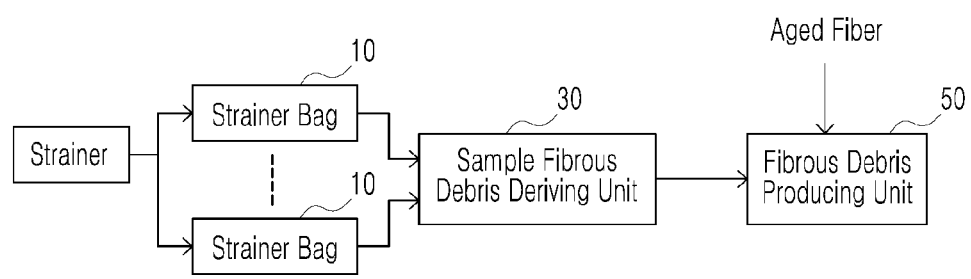
FIG. 1 is a diagram showing the configuration of a test debris producing apparatus for a nuclear power plant according to an embodiment of the present invention.
Figure 2:
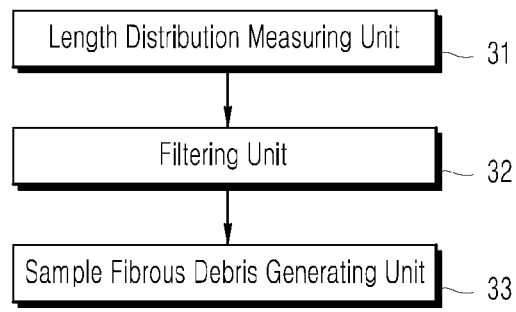
FIG. 2 is a diagram showing a detailed configuration of a sample fibrous debris deriving unit of a fibrous debris producing apparatus for a nuclear power plant according to an embodiment of the present invention.

FIG. 1 is a diagram showing the configuration of a test debris producing apparatus for a nuclear power plant according to an embodiment of the present invention, and FIG. 2 is a diagram showing a detailed configuration of a sample fibrous debris deriving unit shown in FIG. 1. A fibrous debris of test producing apparatus for a nuclear power plant according to an embodiment of the present invention is provided to produce fibrous debris of test having a uniform length distribution equal to the length distribution of fibrous debris passing through a strainer, collected by a plurality of strainer bags and conduct a test for evaluating the influence of debris in the core due to a loss of coolant accident based on produced fibrous debris for testing. The apparatus comprises a plurality of strainer bags 10, a sample fibrous debris deriving unit 30, and fibrous debris producing unit 50.

A plurality of strainer bags 10 are provided to collect fibrous debris passed through a strainer and the collected fibrous debris is transferred to a sample fibrous debris deriving unit 30.

Accordingly, when fibrous debris passed through the strainer is collected, the fibrous debris screened by at least two strainer bags is all collected. At this time, there can be loss of fibrous debris in case collecting is conducted with a strain bag 10 in a dried condition. For example, there is limit to collecting small fibrous debris less than 50 μm. Accordingly, such fibrous debris can be conducted by using water flowing backward.

And the mass of dried strainer bags before the collection of fibrous debris is measured, the mass of collected fibrous debris after the collection is measured, and the collected fibrous debris mass and non-collected fibrous debris mass are recorded in a predetermined memory area.

In this case, the strainer bag 10 filters fibrous debris having length longer than 1 μm, and there is fibrous debris which is not retrieved during the collection of fibrous debris having length less than 200 μm and remains.

Accordingly, the sample fibrous debris deriving unit 30 generates a difference from the length distribution degree of the population due to the fibrous debris of such a small size collected in the region. Therefore, the length distribution of the region is removed, and the sample fibrous debris of the removed length distribution is set.

As shown in FIG. 2, the sample fibrous debris deriving unit 30 comprises the length distribution measuring unit 31 for measuring the length distribution of the collected fibrous debris, a filtering unit 32 for removing the length distribution out of a predetermined critical range of length distribution degree, and a sample fibrous debris generating unit 33 for setting fibrous debris having the length distribution within a critical range to sample fibrous debris.

At this time, the number of the collected fibrous debris should be at least 30,000 or more. Since the distribution degree meter 31 has a high possibility of generating the length distribution degree that deviates from the critical range due to the measurement error and the limitation of the number of objects to be measured, an optical microscope for manual measurement is not used but a fiber length measuring device such as a fiber tester is used. Accordingly, the measurement error of the length of the fibrous debris can be minimized and the possibility of generating the length distribution degree that deviates from the critical range due to a large number of objects to be measured can be reduced.

In addition, the sample fibrous debris deriving unit 30 generates sample fibrous debris having representativeness of the length distribution degree by generating respectively the length distribution of fibrous debris collected in at least two strainer bags and determining the representativeness of the length distribution.

Figure 3:
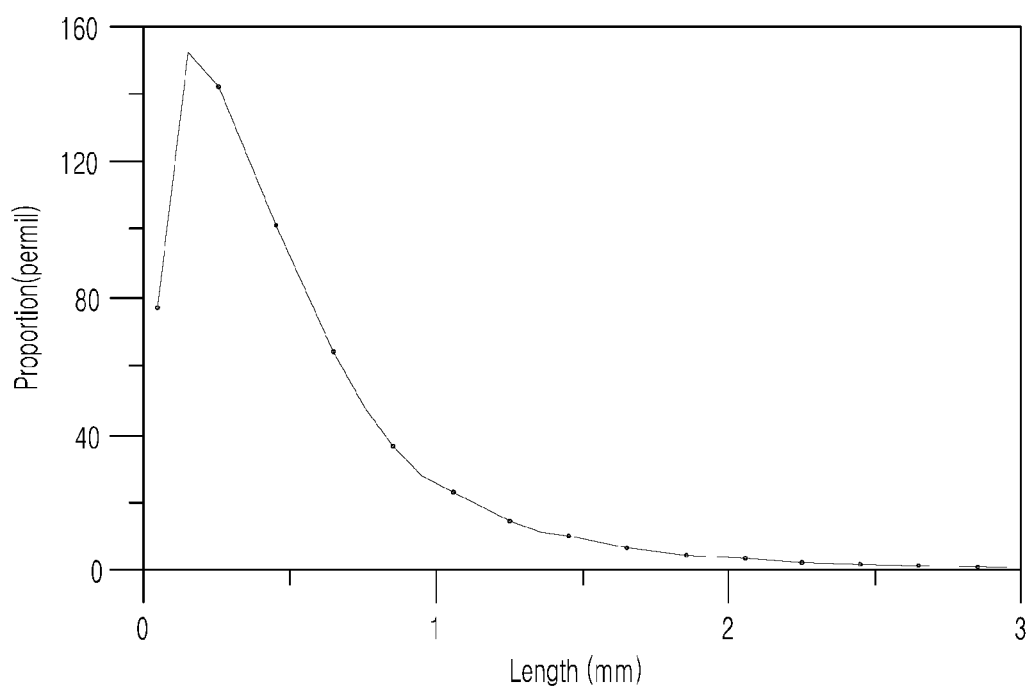
FIG. 3 is a view showing the length distribution degree of fibrous debris collected in strainer bags of a fibrous debris of test producing apparatus for a nuclear power plant according to an embodiment of the present invention.

FIG. 3 is a view showing the length distribution degree of fibrous debris measured with the length distribution measuring unit 31. The length distribution is calculated by summating the number of objects to be measured per interval unit of 10 μm and expressed as a percentage.

Figure 4:
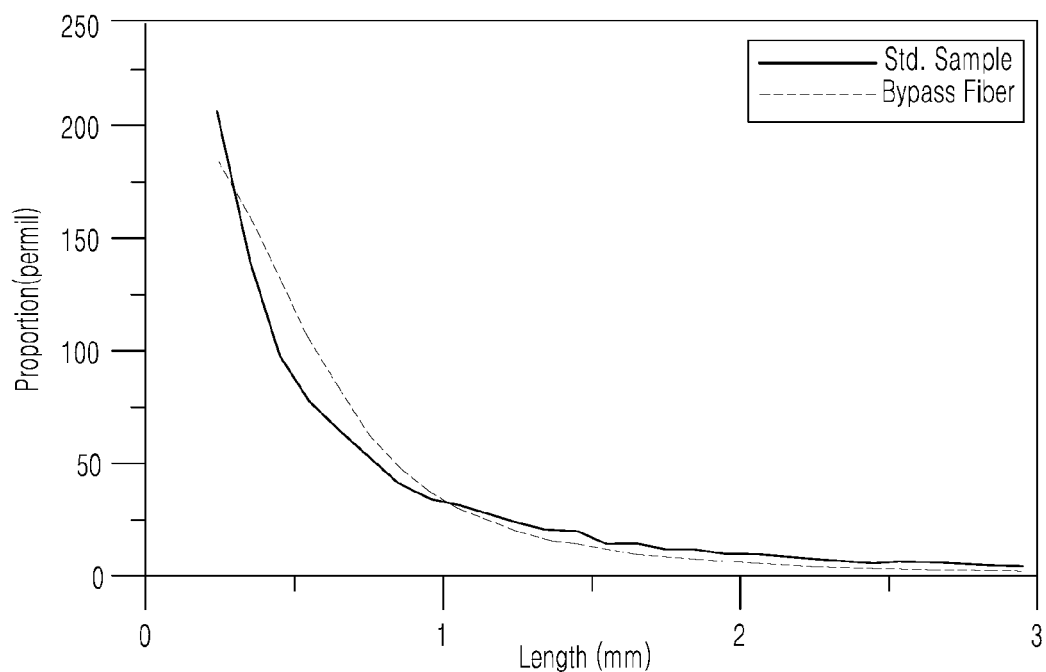
FIG. 4 is a view showing the length distribution of sample fibrous debris in a fibrous debris of test producing apparatus for a nuclear power plant according to an embodiment of the present invention.

FIG. 4 is a diagram showing degree of length distribution of sample fibrous debris and shows that the sample fibrous debris is set by removing the fibrous debris region where the length distribution degree is smaller than 200 μm in the degree of length distribution of fibrous debris shown in FIG. 3.

That is, since the number of objects to be measured is small in a region smaller than 200 μm, the difference from the actual degree of fibrous debris distribution occurs. Accordingly, fibrous debris having the length distribution degree in a critical range excluding a distorted region is determined as a sample fibrous debris by judging a region smaller than 200 μm as a distorted region.

Figure 5:
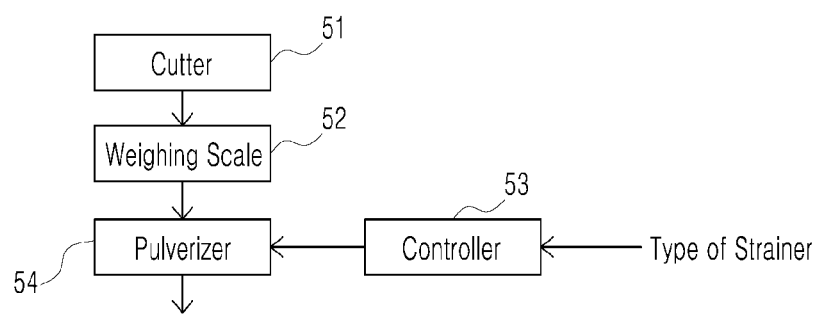
FIG. 5 is a view showing a detailed configuration of fibrous debris producing unit of a fibrous debris of test producing apparatus for a nuclear power plant according to an embodiment of the present invention.

FIG. 5 is a diagram showing a detailed configuration of the fibrous debris producing unit 50 shown in FIG. 1. As shown in FIG. 5, the configuration is provided to produce fibrous debris of test having the length distribution degree of sample fibrous debris generated from sample fibrous debris deriving unit 30.

Accordingly, the fibrous debris producing unit 50 comprises a cutter for cutting fibers to a predetermined size; a weighing scale 52 for selecting fiber of a predetermined weight by measuring the weight of the cut fiber of a predetermined size; a controller for controlling an applied voltage and pulverization time of the pulverizer for pulverizing the fibers having a certain weight and size by the length distribution of the sample fibrous debris; and a pulverizer 54 for pulverizing in the basis of the applied voltage and pulverization time fibers of a certain weight selected for generating fibrous debris of test which are uniform and have the same distribution as the sample fibrous debris.

The aged fiber for an in-reactor downstream effect test is cut by the cutter 51 to a uniform size. That is, the fibers to be cut are cut to the length and width of 2.5 cm*2.5 cm, and the cut fibers are transferred to the weighing scale 52.

The weighing scale 52 provides a pulverizer 54 with a predetermined amount at least 3 g of the fibers cut by the cutter 51. The predetermined amount is set to a one-time pulverizing amount, and the amount is set to be 1% larger than the predetermined amount in consideration of the loss amount during pulverization. In addition, the one-time pulverizing amount may vary depending on a pulverizer, and it is limited to be smaller than a certain amount in consideration of the reproducibility of the test.

Since the pulverization length of the fiber is determined according to the pulverization time and the applied voltage at the pulverizer 54, the control unit 53 sets the pulverization time and the applied voltage based on the type of strainer. In addition, the length of the produced fibrous debris varies according to the kind of the pulverizer, but the applied voltage rather than the pulverization time affects the length distribution of the produced. Accordingly, the fibrous debris is pulverized by the constant pulverizing time and the varying applied voltage. In other words, the power supply of 200 V and the applied voltage are varied by 10 V, 60 V, and the like.

On the other hand, the fibrous debris of test pulverized in the pulverizer 54 is judged by the controller 53 whether the length distribution of the fibrous debris of test equals to the length distribution of the debris of the sample fibrous debris.

As shown in FIG. 3, the length distribution degree of the fibrous debris of test produced through the pulverizer 54 shows a conservative result when there is a lot of debris having a large length and the number of objects in the region larger than 1 mm is larger than the number of sample fibrous debris.

In case, by the judgment of the controller 53, the length distribution of the fibrous debris of test and the length distribution of the sample fibrous debris coincide with each other, the applied voltage and the pulverization time of the pulverizer 54 are stored in a predetermined memory area by matching with the type of strainer.

The controller 53 measures the length distribution of the fibrous debris pulverized by the pulverizer 54, and judges whether the measured fibrous debris length distribution coincides with the length distribution of the sample fibrous debris. In case coincidence occurs, the applied voltage and the pulverization time of the pulverizer are stored in a predetermined memory area.

The produced debris for testing is used for the downstream effect test in the core.

Accordingly, fibrous debris of test having the uniform length distribution equal to the fibrous debris collected by a plurality of strainer bags while passing through a strainer is produced, and a test for evaluating the influence of debris in the core due to a loss of coolant accident is conducted based on the produced fibrous debris for testing, thereby ensuring reproducibility of a test for evaluating the influence of debris in the core due to a loss of coolant accident and, thereby producing conservative experimental data.

Figure 6:
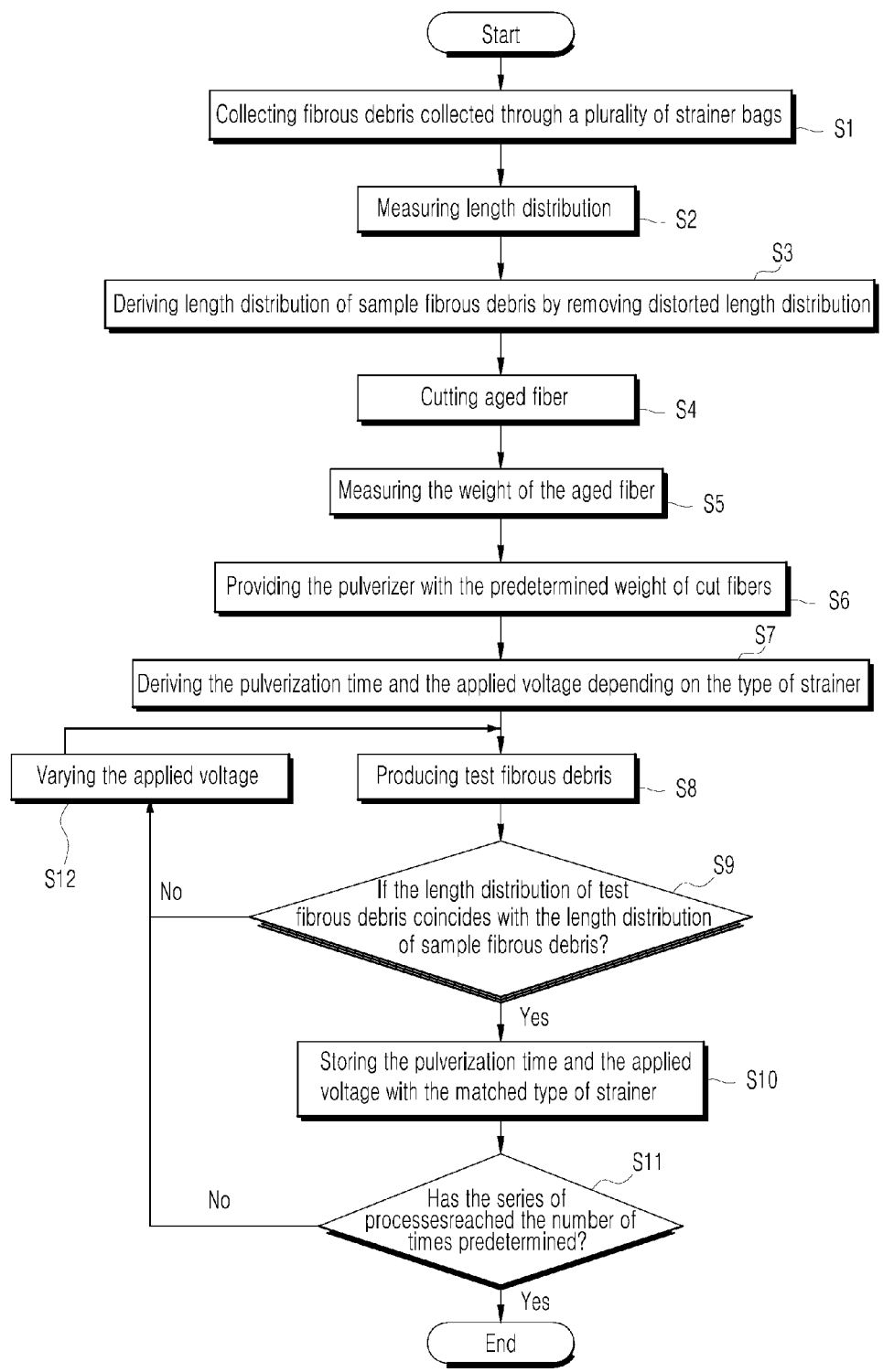
FIG. 6 is a flowchart showing a process for producing fibrous debris of test for a nuclear power plant according to another embodiment of the present invention.

FIG. 6 is a flow chart showing the operational process of the fibrous debris of test for a nuclear power plant shown in FIG. 1. With FIG. 6, a process for producing fibrous debris for a nuclear power plant is established.

First, fibrous debris passed through a strainer is collected in a plurality of strainer bags, and length distribution of the fibrous debris collected by the sample fibrous debris deriving unit 30 is measured S1, S2.

The sample fibrous debris deriving unit 30 removes the fibrous debris in the distorted length distribution region and sets the length distribution of fibrous debris within a predetermined critical range to the length distribution of the sample fibrous debris S3.

Meanwhile, the fibrous debris producing unit 50 cuts the aged fiber at a predetermined size and then provides the pulverizer with a predetermined weight of the fibers cut to have a uniform size S4, S5.

The fibrous debris producing unit 50 sets the previously stored pulverization time and applied voltage according to the type of filter, and the set pulverization time and applied voltage are transferred to the pulverizer to pulverize the fibers of a predetermined weight S6, S7.

Accordingly fibrous debris of test is produced.

The fibrous debris producing unit 50 judges whether the measured fibrous debris length distribution coincides with the length distribution of the sample fibrous debris, and stores the applied voltage and the pulverization time of the pulverizer in a predetermined memory area by matching with the type of strainer in case coincidence occurs S9, S10.

The fibrous debris producing unit 50 determines whether the above-described series of processes has reached the number of times predetermined by the manufacturer or the tester, and ends the present program when the predetermined number of times is reached S11.

On the other hand, if it is determined in step S11 that the predetermined number of times has not been reached, the fibrous debris producing unit 50 proceeds to step S7 after changing the applied voltage S12. If the length distribution of the fibrous debris of test does not coincide with the length distribution of the sample fibrous debris, the process proceeds to step S12. The fibrous debris of test produced through the above process is used for the downstream effect test in the core.

According to the embodiment of the present invention, fibrous debris of test having the same length distribution as fibrous debris passed through a strainer and collected by a plurality of strainer bags is produced. By carrying out the test for evaluating the influence of debris in the core due to the loss of coolant accident based on the produced fibrous debris for testing, the test reproducibility can be acquired by the fibrous debris of test having a uniform length distribution, thereby producing conservative experimental data.

The steps of a method or algorithm described in connection with the embodiments disclosed herein may be embodied in the form of program instructions, which may be performed via a variety of computing means, and recorded in a computer-readable medium. The computer-readable medium may include program instructions, data files, data structures, and the like, alone or in combination. The program instructions recorded on the medium may be those specially designed and constructed for the present invention or may be available to those skilled in the art of computer software. Examples of computer-readable media include magnetic media such as hard disks, floppy disks and magnetic tape; optical media such as CD-ROMs and DVDs; magneto-optical media such as floptical disks; and hardware devices specifically configured to store and execute program instructions such as ROM, RAM, flash memory, and the like. Examples of program instructions include machine language codes such as those generated by a compiler, as well as high-level language codes that can be executed by a computer using an interpreter or the like. The hardware devices described above may be configured to operate as one or more software modules to perform the operations of the present invention, and vice versa.

While the present invention has been particularly shown and described with reference to exemplary embodiments thereof, it is to be understood that the invention is not limited to the disclosed exemplary embodiments. It will be appreciated by those skilled in the art that numerous changes and modifications may be made without departing from the spirit and scope of the invention. It is therefore intended that all such appropriate modifications and variations fall within the scope of the invention.

INDUSTRIAL APPLICABILITY

Fibrous debris of test having the uniform length distribution equal to the fibrous debris collected by a plurality of strainer bags while passing through a strainer is produced, and a test for evaluating the influence of debris in the core due to a loss of coolant accident is conducted based on the produced fibrous debris for testing, thereby ensuring reproducibility of a test for evaluating the influence of debris in the core due to a loss of coolant accident and, thereby producing conservative experimental data. Accordingly, there may bring advancements in exactitude of operation, reliability, and operational efficiency in respect to the apparatus and the method for producing fibrous debris for a nuclear power plant. The present invention is industrially applicable since there is not only a good chance of the commercialization or sales of the nuclear power plants to be applied but also practical possibility to carry out clearly.

The invention claimed is:

1. An apparatus for producing fibrous debris of test for a nuclear power plant comprising:
   a sample fibrous debris deriving unit comprising a plurality of fibrous debris strainer bags for collecting fibrous debris passed through a sump strainer, measuring the length distribution of fibrous debris collected in a plurality of the strainer bags, and deriving a sample fibrous debris by removing a distorted length distribution among the measured length distribution of fibrous debris; and further
   a fibrous debris producing unit for producing fibrous debris of test having a uniform length distribution equal to the length distribution of the sample fibrous debris of the sample fibrous debris deriving unit and using the fibrous debris for the core downstream type effect test.

2. The apparatus for producing fibrous debris of test for a nuclear power plant according to claim 1, wherein the sample fibrous debris deriving unit comprises:
   a length distribution measuring unit for measuring the length distribution of the collected fibrous debris;
   a filtering unit for removing fibrous debris in a distorted length distribution region and extracting the length distribution of fibrous debris within a predetermined critical range with respect to the length distribution of the measured fibrous debris; and
   a sample fibrous debris generating unit for setting the length distribution of the fibrous debris passed through the filtering unit as the length distribution of the sample fibrous debris and transferring the debris to the fibrous debris generating unit.

3. The apparatus for producing fibrous debris of test for a nuclear power plant according to claim 2, wherein the fibrous debris producing unit is provided to produce fibrous debris of test by pulverizing aged fiber so as to have the length distribution of the sample fibrous debris.

4. The apparatus for producing fibrous debris of test for a nuclear power plant according to claim 2, wherein the fibrous debris producing unit comprises:
   a cutter for cutting aged fiber to a predetermined size;
   a weighing scale for selecting fiber of a predetermined weight by measuring the weight of the cut fiber of a predetermined size;
   a controller for setting the pre-stored applied voltage and the pulverization time according to the type of strainer; and
   a pulverizer for pulverizing fibers having a predetermined weight based on the voltage applied to the controller and the pulverization time for pulverizing the fibers having a predetermined weight and size by the length distribution of the sample fibrous debris.

5. The apparatus for producing fibrous debris of test for a nuclear power plant according to claim 4, wherein the controller is provided to measure the length distribution of the fibrous debris pulverized by the pulverizer and judge whether the measured fibrous debris length distribution coincides with the length distribution of the sample fibrous debris, and the applied voltage and the pulverization time of the pulverizer are stored in a predetermined memory area along with the matched type of strainer if coincidence occurs.

6. A method for producing fibrous debris of test for a nuclear power plant comprising the steps of:
   (A) collecting fibrous debris passed through a strainer in a plurality of strainer bags;
   (B) measuring the length distribution of the fibrous debris collected by the sample fibrous debris deriving unit;
   (C) removing fibrous debris in a distorted length distribution region with respect to the length distribution of the measured fibrous debris and setting the length distribution of the fibrous debris within a predetermined critical range to the length distribution of the sample fibrous debris; and
   (D) generating fibrous debris of test having a uniform length distribution equal to the length distribution of the sample fibrous debris in the fibrous debris generating apparatus.

7. The method for producing fibrous debris of test for a nuclear power plant according to claim 6, wherein the step (D) comprises the steps of:
   cutting given aged fiber to a predetermined size;
   measuring the weight of the cut fibers of a predetermined size so as to select fibers of a predetermined weight;
   controlling pulverization for setting a predetermined applied voltage and pulverization time according to the type of strainer; and
   pulverizing for producing fibrous debris of test having a uniform length distribution equal to the length distribution of the sample fibrous debris with the fibers having a predetermined weight based on the applied voltage and the pulverization time.

8. The method for producing fibrous debris of test for a nuclear power plant according to claim 7, wherein the step (D) comprises measuring the length distribution of the fibrous debris pulverized by the pulverizer, judging whether the measured fibrous debris length distribution coincides with the length distribution of the sample fibrous debris, and in case coincidence occurs, storing the applied voltage and the pulverization time of the pulverizer in a predetermined memory area with the matched type of strainer.

* * * * *